United States Patent
Oshima et al.

(10) Patent No.: US 11,070,086 B2
(45) Date of Patent: Jul. 20, 2021

(54) POWER RECEIVING UNIT, POWER TRANSMISSION SYSTEM, AND METHOD OF CONTROLLING THE POWER RECEIVING UNIT

(71) Applicant: FUJITSU LIMITED, Kawasaki (JP)

(72) Inventors: Hirotaka Oshima, Machida (JP); Kiyoto Matsui, Miki (JP)

(73) Assignee: FUJITSU LIMITED, Kawasaki (JP)

( * ) Notice: Subject to any disclaimer, the term of this patent is extended or adjusted under 35 U.S.C. 154(b) by 512 days.

(21) Appl. No.: 15/902,395

(22) Filed: Feb. 22, 2018

(65) Prior Publication Data

US 2018/0287427 A1    Oct. 4, 2018

(30) Foreign Application Priority Data

Mar. 29, 2017    (JP) .............................. JP2017-065427

(51) Int. Cl.
*H02J 7/00*    (2006.01)
*H02J 7/14*    (2006.01)
(Continued)

(52) U.S. Cl.
CPC .............. *H02J 50/12* (2016.02); *H02J 7/025* (2013.01); *H02M 3/22* (2013.01)

(58) Field of Classification Search
USPC ....................................................... 320/107
See application file for complete search history.

(56) References Cited

U.S. PATENT DOCUMENTS 7,953,369 B2    5/2011    Baarman
8,338,990 B2 *  12/2012   Baarman .............. H04B 5/0062
                                                    307/104
(Continued)

FOREIGN PATENT DOCUMENTS

JP    H10-285836 A    10/1998
JP    2009-213351 A    9/2009
(Continued)

OTHER PUBLICATIONS

Office Action of Japanese Patent Application No. 2017-065427: Notice of Reasons for Refusal dated Oct. 27, 2020 (2 sheets, 5 sheets translation, 7 sheets total).

(Continued)

*Primary Examiner* — Alexis B Pacheco
(74) *Attorney, Agent, or Firm* — Kratz, Quintos & Hanson, LLP

(57) ABSTRACT

A power receiving unit includes a secondary resonant coil for receiving electric power from a primary resonant coil using magnetic resonance or electric field resonance, a secondary coil capable of changing a number of turns or a pitch of a winding for receiving the electric power from the secondary resonant coil using electromagnetic induction, a rectification circuit, and a controller. The electric power received by the secondary coil is rectified by the rectification circuit, and transmitted to a DC-DC converter for supplying the electric power to a load circuit. The controller changes the number of turns or the pitch of the winding of the secondary coil such that an input voltage of the DC-DC converter does not exceed an upper limit, based on a magnitude of the electric power received from the primary resonant coil.

3 Claims, 12 Drawing Sheets

(51) Int. Cl.
*H02J 50/12* (2016.01)
*H02M 3/22* (2006.01)
*H02J 7/02* (2016.01)

(56) References Cited

U.S. PATENT DOCUMENTS

| | | | |
|---|---|---|---|
| 8,482,159 B2 | 7/2013 | Shimokawa | |
| 2011/0006612 A1* | 1/2011 | Kozakai | H02J 7/00034 307/104 |
| 2013/0038282 A1 | 2/2013 | Shimokawa | |
| 2014/0159502 A1* | 6/2014 | Shimokawa | H02J 7/00034 307/104 |
| 2015/0008755 A1 | 1/2015 | Sone | |
| 2015/0244341 A1* | 8/2015 | Ritter | H02J 50/12 307/104 |
| 2016/0056664 A1* | 2/2016 | Partovi | B60L 53/122 307/104 |
| 2016/0094050 A1 | 3/2016 | Shichino et al. | |
| 2016/0190862 A1* | 6/2016 | Ma | H02J 7/025 320/108 |
| 2016/0352147 A1* | 12/2016 | Von Novak, III | H02J 50/12 |
| 2016/0365752 A1* | 12/2016 | Misawa | H02J 3/18 |
| 2017/0170689 A1* | 6/2017 | Jeong | H04B 5/0037 |
| 2017/0187245 A1* | 6/2017 | Uchida | H02J 50/90 |
| 2017/0207657 A1* | 7/2017 | Kotani | H02J 7/007184 |
| 2017/0207663 A1* | 7/2017 | Park | H02J 7/025 |
| 2018/0041074 A1 | 2/2018 | Sone | |

FOREIGN PATENT DOCUMENTS

| | | |
|---|---|---|
| JP | 2010-239777 A | 10/2010 |
| JP | 2011-019291 A | 1/2011 |
| JP | 2015-012634 A | 1/2015 |
| JP | 2015-012761 A | 1/2015 |
| JP | 2015-122920 A | 7/2015 |
| WO | 2011/135722 A1 | 11/2011 |

OTHER PUBLICATIONS

Office Action of Japanese Patent Application No. 2017-065427: Notification of Reasons for Refusal dated Oct. 27, 2020 (2 sheets, 5 sheets translation, 7 sheets total).

Office Action of Japanese Patent Application No. 2017-065427: Notice of Reasons for Refusal dated Oct. 21, 2020 (2 sheets, 5 sheets translation, 7 sheets total).

Office Action of Japanese Application No. 2017-065427: Notification of Reasons for Refusal dated Oct. 27, 2020 (2 sheets, 5 sheets translation, 7 sheets total).

* cited by examiner

POWER RECEIVING UNIT, POWER TRANSMISSION SYSTEM, AND METHOD OF CONTROLLING THE POWER RECEIVING UNIT

CROSS-REFERENCE TO RELATED APPLICATION

This application is based upon and claims the benefit of priority of the prior Japanese Patent Application No. 2017-065427, filed on Mar. 29, 2017, the entire contents of which are incorporated herein by reference.

FIELD

The embodiments discussed herein relate to a power receiving unit, a power transmission system, and a method of controlling the power receiving unit.

BACKGROUND

As a related art of the present disclosure, a contactless power receiving apparatus is available. The contactless power receiving apparatus includes a resonance element to receive supply of alternating-current power in a contactless fashion by means of resonance from a resonance element of a power supplying source, an excitation element to receive supply of the alternating-current power by means of electromagnetic induction from the resonance element, a rectification circuit to generate and output direct-current power from the alternating-current power received by the excitation element, and a changeover circuit to change over the alternating-current power between a supplied state and a non-supplied state to the rectification circuit (see Patent Document 1, for example).

However, because the contactless power receiving apparatus according to the related art does not control an amount of electric power that is received from a power transmitting unit having the resonance element in the power supplying source, electric power cannot be transmitted effectively between the contactless power receiving apparatus and the power transmitting unit.

The following is a reference document:
[Patent Document 1] Japanese Laid-Open Patent Publication No. 2011-019291.

SUMMARY

A power receiving unit according to an aspect of the embodiment includes: a secondary resonant coil configured to receive electric power from a primary resonant coil using magnetic resonance or electric field resonance occurring between the primary resonant coil and the secondary resonant coil, a secondary coil capable of changing a number of turns or a pitch of a winding configured to receive electric power from the secondary resonant coil using electromagnetic induction, a rectification circuit connected to an output side of the secondary coil configured to perform full-wave rectification of an alternating current power, a smoothing circuit connected to an output side of the rectification circuit, an output terminal for connecting an output side of the smoothing circuit with a DC-DC converter configured to supply electric power to a load circuit, and a controller configured to control the number of turns or the pitch of the winding of the secondary coil such that an input voltage of the DC-DC converter does not exceed an upper limit, based on a magnitude of the electric power received from the primary resonant coil.

The object and advantages of the invention will be realized and attained by means of the elements and combinations particularly pointed out in the claims. It is to be understood that both the foregoing general description and the following detailed description are exemplary and explanatory and are not restrictive of the invention.

DESCRIPTION OF EMBODIMENT

Hereinafter, a power receiving unit, a power transmission system, and a method of controlling the power receiving unit according to embodiments of the present disclosure will be described.

Embodiment

Before describing a power receiving unit, a power transmission system, and a method of controlling the power receiving unit according to the present disclosure, background technology of a power receiving unit and a power transmission system according to the present embodiment will be described with reference to FIG. 1.

Figure 1:
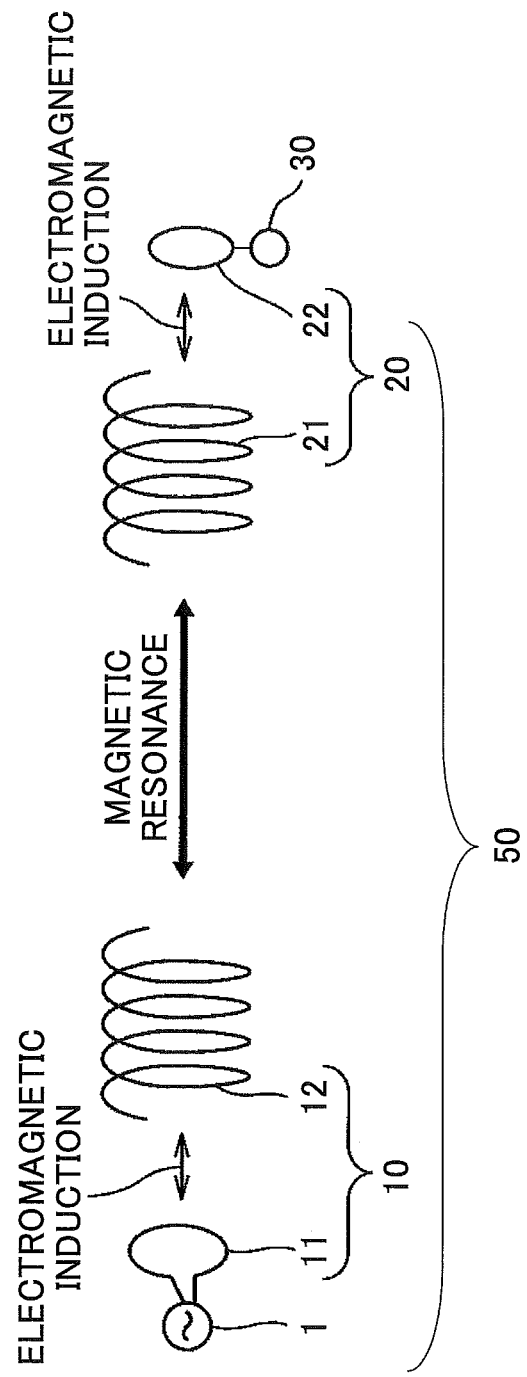
FIG. 1 is a diagram illustrating a power transmission system.

FIG. 1 is a diagram illustrating a power transmission system 50.

As illustrated in FIG. 1, the power transmission system 50 includes an alternating current power source (AC power source) 1, a power transmitting unit 10 in a primary side (power transmitting side), and a power receiving unit 20 in a secondary side (power receiving side). The power transmission system 50 may include multiple power transmitting units 10 or multiple power receiving units 20.

The power transmitting unit 10 includes a primary coil 11 and a primary resonant coil 12. The power receiving unit 20 includes a secondary resonant coil 21 and a secondary coil 22. A load device 30 is connected to the secondary coil 22.

As illustrated in FIG. 1, the power transmitting unit 10 and the power receiving unit 20 transmit energy (electric power) from the power transmitting unit 10 to the power receiving unit 20 using magnetic resonance between the primary resonant coil 12 and the secondary resonant coil 21. Electric power can be transmitted from the primary resonant coil 12 to the secondary resonant coil 21 by not only using magnetic resonance, but also using electric field resonance. However, in the following description, power transmission using magnetic resonance will be mainly described.

Further, in the present embodiment, a case is described in which a frequency of a voltage output by the AC power source 1 is 6.78 MHz, and a resonant frequency of the primary resonant coil 12 and a resonant frequency of the secondary resonant coil 21 are 6.78 MHz.

Note that electric power is transmitted from the primary coil 11 to the primary resonant coil 12 using electromagnetic induction.

Electromagnetic induction is also used for a power transmission from the secondary resonant coil 21 to the secondary coil 22.

Next, with reference to FIGS. 2 and 3, the power receiving unit and the power transmission system according to the present embodiment will be described.

Figure 2:
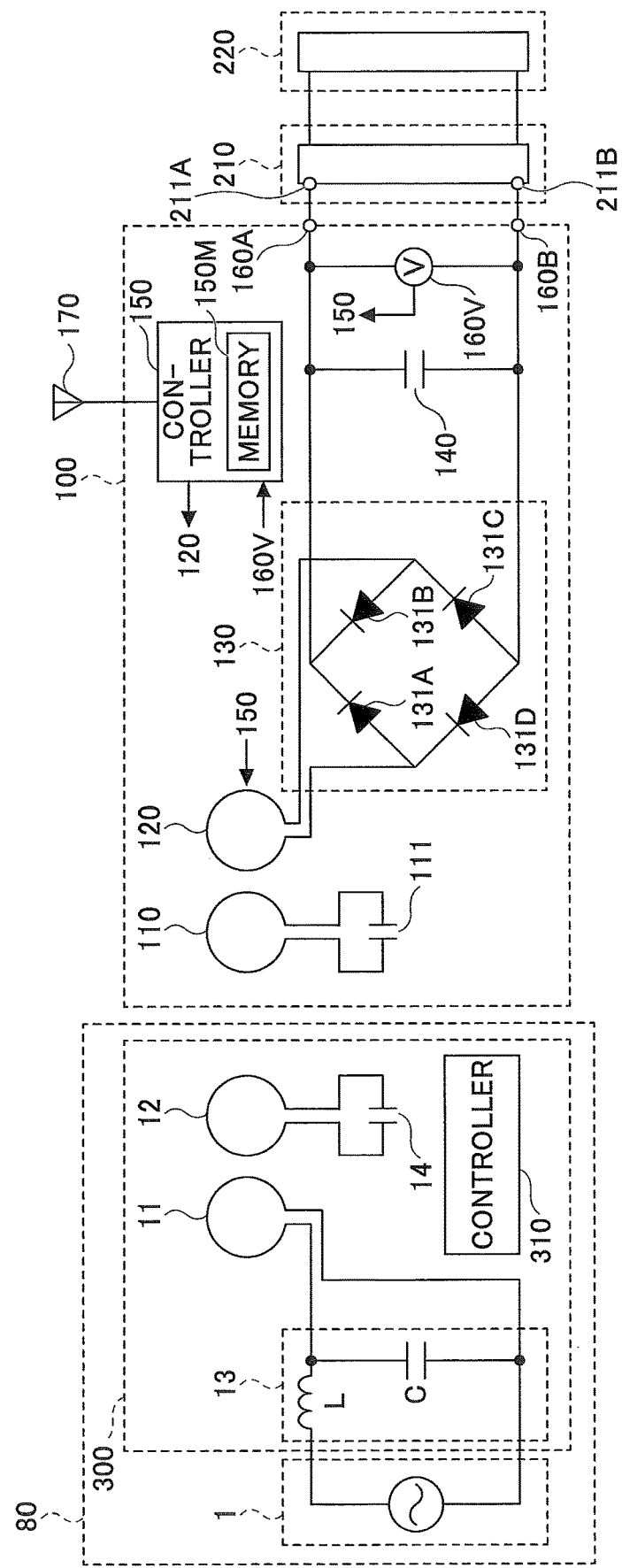
FIG. 2 is a diagram illustrating a power receiving unit and a power transmitting apparatus according to an embodiment.

FIG. 2 is a diagram illustrating a power receiving unit 100 and a power transmitting apparatus 80 according to the present embodiment. The power transmitting apparatus 80 includes an AC power source 1 and a power transmitting unit 300.

The AC power source 1 is the same as that illustrated in FIG. 1.

The power transmitting apparatus 80 includes the AC power source 1 and the power transmitting unit 300.

The power transmitting unit 300 includes a primary coil 11, a primary resonant coil 12, a matching circuit 13, a capacitor 14, and a controller 310.

The power receiving unit 100 includes a secondary resonant coil 110, a secondary coil 120, a rectification circuit 130, a smoothing capacitor 140, a controller 150, a pair of output terminals 160A and 160B, a voltage detector 160V, and an antenna 170. To the output terminals 160A and 160B, a DC-DC converter 210 is connected. Further, a battery 220 is connected to an output of the DC-DC converter 210. In FIG. 2, a case in which a load circuit is the battery 220 is illustrated.

First, a configuration of the power transmitting unit 300 will be described. As illustrated in FIG. 2, the primary coil 11 is a loop shaped coil, and is connected to the AC power source 1 via the matching circuit 13. The primary coil 11 is disposed close to the primary resonant coil 12 in a noncontact manner, and is coupled to the primary resonant coil 12 electromagnetically. The primary coil 11 is disposed such that a center axis of the primary coil 11 coincides with a center axis of the primary resonant coil 12. The reason the center axis of the primary coil 11 is made to coincide with a center axis of the primary resonant coil 12 is to improve a coupling strength between the primary coil 11 and the primary resonant coil 12 and to suppress occurrence of an unnecessary electromagnetic field around the primary coil 11 and the primary resonant coil 12, by reducing leakage of magnetic flux.

The primary coil 11 produces a magnetic field using AC power supplied from the AC power source 1 via the matching circuit 13, and transmits electric power to the primary resonant coil 12 using electromagnetic induction.

As illustrated in FIG. 2, the primary coil 11 is disposed close to the primary resonant coil 12 in a noncontact manner, and is coupled to the primary resonant coil 12 electromagnetically. The primary resonant coil 12 has a predetermined resonant frequency, and is designed to have a high Q factor. The primary resonant coil 12 is designed to have the same resonant frequency as the resonant frequency of the secondary resonant coil 110. The capacitor 14 is connected to the primary resonant coil 12 such that each terminal of the capacitor 14 is respectively connected to a corresponding terminal of the primary resonant coil 12 to control the resonant frequency.

The primary resonant coil 12 is configured such that the resonant frequency is the same as a frequency of AC power output by the AC power source 1. The resonant frequency of the primary resonant coil 12 is determined by inductance of the primary resonant coil 12 and capacitance of the capacitor 14. Therefore, the capacitance of the capacitor 14 is set such that the resonant frequency of the primary resonant coil 12 is the same as the frequency of the AC power output by the AC power source 1.

The matching circuit 13 is disposed between the primary coil 11 and the AC power source 1 for impedance matching, and includes an inductor L and a capacitor C.

The AC power source 1 is a power source for outputting AC power having a frequency necessary for magnetic resonance, and includes an amplifier to amplify output power. The AC power source 1 outputs, for example, AC power having a high frequency between hundreds of kilohertz and tens of megahertz.

The capacitor 14 is a variable capacitor. Each terminal of the capacitor 14 is respectively connected to the corresponding terminal of the primary resonant coil 12. The capacitor 14 is provided to control the resonant frequency of the primary resonant coil 12, and the capacitance of the capacitor 14 is set by the controller 310.

The controller 310 controls an output voltage and an output frequency of the AC power source 1, capacitance of the capacitor 14, a magnitude of electric power output from the primary resonant coil 12, and the like.

The above described power transmitting apparatus 80 transmits electric power supplied to the primary coil 11 from the AC power source 1, to the primary resonant coil 12 using electromagnetic induction, and transmits the electric power from the primary resonant coil 12 to the secondary resonant coil 110 of the power receiving unit 100 using magnetic resonance.

The secondary resonant coil 110 has a same resonant frequency as the resonant frequency of the primary resonant coil 12, and is designed to have a high Q factor. A pair of terminals of the secondary resonant coil 110 is connected to a capacitor 111. The secondary resonant coil 110 is coupled to the secondary coil 120 electromagnetically, and transmits electric power to the secondary coil 120 using electromagnetic induction. The secondary resonant coil 110 transmits electric power, which is received from the primary resonant coil 12 of the power transmitting unit 300 using magnetic resonance, to the secondary coil 120 using electromagnetic induction. The secondary resonant coil 110 corresponds to the secondary resonant coil 21 illustrated in FIG. 1.

The secondary coil 120 is configured such that the number of turns of a winding is variable. A pair of terminals of the secondary coil 120 is connected to the rectification circuit 130. The secondary coil 120 outputs electric power, received from the secondary resonant coil 110 using electromagnetic induction, to the rectification circuit 130.

The reason the number of turns of the secondary coil 120 is variable is to make output voltage of the secondary coil 120 variable and to make input voltage of the DC-DC converter 210 variable. By making the input voltage of the DC-DC converter 210 variable, efficient electric power transmission between the power receiving unit 100 and the power transmitting apparatus 80 is possible while the input voltage of the DC-DC converter 210 is controlled within a predetermined range.

If the number of turns of the secondary coil 120 is variable, the output voltage of the secondary coil 120 can be changed in accordance with the number of turns of the secondary coil 120. Further, making the input voltage of the DC-DC converter 210 variable is equivalent to making a load resistance of the DC-DC converter 210 as seen by input terminals 211A and 211B variable.

Accordingly, by controlling the number of turns of the secondary coil 120, efficient electric power transmission between the power receiving unit 100 and the power transmitting apparatus 80 can be achieved while the input voltage of the DC-DC converter 210 is controlled within a predetermined range.

A practical structure of such a secondary coil 120 will be described below with reference to FIG. 4.

The rectification circuit 130 includes four diodes 131A, 131B, 131C, and 131D. The diodes 131A to 131D are connected in a bridge configuration. The electric power input from the secondary coil 120 is full-wave rectified by the diodes 131A to 131D, and the rectification circuit 130 outputs the full-wave rectified electric power.

The smoothing capacitor 140 is connected to an output side of the rectification circuit 130, and smooths the electric power, which was full-wave rectified at the rectification circuit 130, to output direct current power (DC power). The output terminals 160A and 160B are connected to an output side of the smoothing capacitor 140. Since the negative half of the waveform of the AC power input to the rectification circuit 130 is inverted, the electric power which was full-wave rectified at the rectification circuit 130 can be treated as DC power substantially. However, even for a case of the full-wave rectified electric power including ripples, steady DC power can be obtained by using the smoothing capacitor 140.

The controller 150 includes a memory 150M. The controller 150 controls the number of turns of the secondary coil 120. In response to changing the number of turns of the secondary coil 120, the controller 150 sends data indicating that the number of turns has been changed to the power transmitting unit 300 via the antenna 170.

The controller 150 receives a signal representing an amount of voltage detected by the voltage detector 160V. The controller 150 detects state of charge of the battery 220. The antenna 170 is connected to the controller 150. The antenna 170 is used for wireless communication with the power transmitting unit 300. Note that the controller 150 and the antenna 170 are an example of a receiving side communication unit.

The voltage detector 160V is for detecting a voltage across the output terminals 160A and 160B, and each terminal of the voltage detector 160V is respectively connected to the output terminals 160A and 160B. The voltage detector 160V inputs a signal representing an amount of the detected voltage to the controller 150. The voltage (voltage across the output terminals 160A and 160B) detected by the voltage detector 160V is an input voltage of the DC-DC converter 210.

The DC-DC converter 210 includes the input terminals 211A and 211B, which are respectively connected to the output terminals 160A and 160B. The DC-DC converter 210 converts a DC voltage output by the power receiving unit 100 into a rated voltage of the battery 220. The voltage across the input terminals 211A and 211B (or the voltage across the output terminals 160A and 160B) is an input voltage of the DC-DC converter 210.

The DC-DC converter 210 is, for example, a step-down DC-DC converter, and lowers an input voltage (a voltage of an electric power supplied via the rectification circuit 130) to the rated voltage of the battery 220. Because a step-down DC-DC converter is low-current and compact as compared to a step-up DC-DC converter or a step-up/down DC-DC converter, the step-down DC-DC converter is suitable for the power receiving unit 100 which is required to be compact. Therefore, it is preferable that the step-down DC-DC converter is used as the DC-DC converter 210.

The load resistance of the DC-DC converter 210 as seen by the input terminals 211A and 211B varies in accordance with step-down control of voltage. When the load resistance varies, the input voltage of the DC-DC converter 210 also varies. The power receiving unit 100 controls the output voltage of the secondary coil 120 by changing the number of turns, so that variation of the input voltage of the DC-DC converter 210 is within a predetermined range.

The load resistance of the DC-DC converter 210 is resistance of a load circuit (on the battery 220 side) as seen by the input terminals 211A and 211B.

The predetermined range of the input voltage of the DC-DC converter 210 is a range of not less than a lower limit of the input voltage and not more than an upper limit of the input voltage. The lower limit of the input voltage is a minimum input voltage for the DC-DC converter 210 to operate normally. If the input voltage is lower than the lower limit, the DC-DC converter 210 cannot perform step-down control, and stops operation. The upper limit of the input voltage is a maximum voltage for the DC-DC converter 210 that is allowed to be input. If the input voltage exceeds the upper limit, the DC-DC converter 210 stops operation because there is a risk that the DC-DC converter 210 may be damaged.

The battery 220 is a secondary cell which is a rechargeable battery. For example, a lithium-ion rechargeable battery can be used as the battery 220. In a case in which the power receiving unit 100 is embedded in an electronic device such as a tablet computer or a smartphone, the battery 220 is a main battery of such an electronic device. The battery 220 outputs data representing the state of charge to the controller 150. By receiving the data, the controller 150 can recognize the state of charge of the battery 220, and can determine if the battery 220 is fully charged.

The primary coil 11, the primary resonant coil 12, and the secondary resonant coil 110 are formed by coiling a copper wire. However, metals other than copper (such as gold or aluminum) may be used for a material of the primary coil 11, the primary resonant coil 12, and the secondary resonant coil 110. Further, a material of each of the primary coil 11, the primary resonant coil 12, and the secondary resonant coil 110 may differ.

In such a configuration, the primary coil 11 and the primary resonant coil 12 correspond to a power transmitting side, and the secondary resonant coil 110 corresponds to a power receiving side.

In the present embodiment, because electric power is transmitted from the power transmitting side to the power receiving side using magnetic resonance generated between the primary resonant coil 12 and the secondary resonant coil 110 (magnetic resonance system), electric power can be transmitted over a longer distance than an electromagnetic induction system to transmit electric power from the power transmitting side to the power receiving side using electromagnetic induction.

Since the magnetic resonance system is more flexible than the electromagnetic induction system with respect to a distance or a position gap between resonant coils, the magnetic resonance system has an advantage called "free-positioning".

Figure 3:
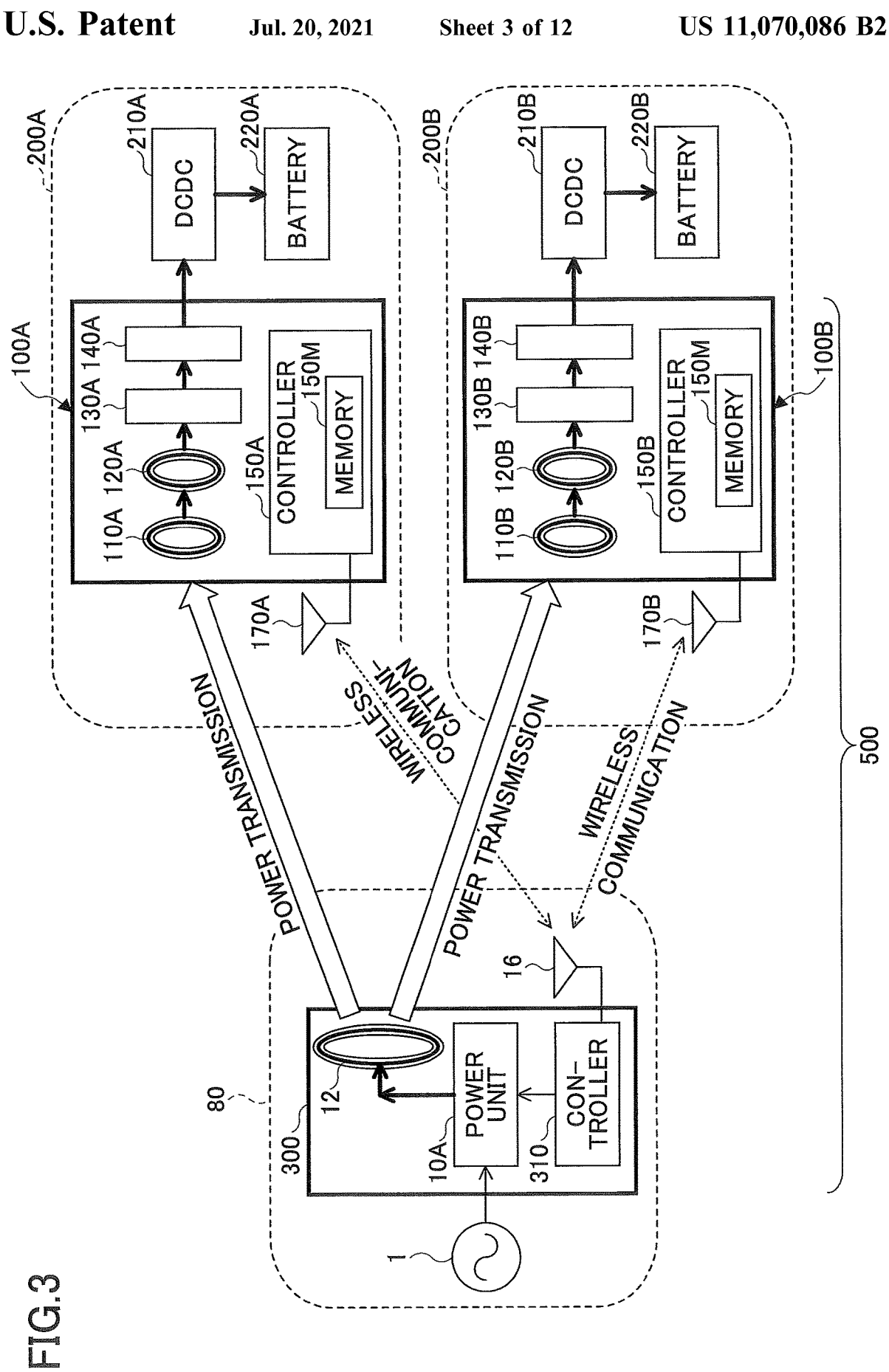
FIG. 3 is a diagram illustrating the power transmitting apparatus and electronic devices using a power transmission system according to the embodiment.

FIG. 3 is a diagram illustrating the power transmitting apparatus 80 and electronic devices 200A and 200B using a power transmission system 500 according to the present embodiment.

The power transmitting apparatus 80 is the same as the power transmitting apparatus 80 illustrated in FIG. 2. However, in FIG. 3, components of the power transmitting apparatus 80 illustrated in FIG. 2, other than the primary resonant coil 12 and the controller 310, are illustrated as a power unit 10A. The power unit 10A denotes a set of the primary coil 11, the matching circuit 13, and the capacitor 14. Alternatively, a set of the AC power source 1, the primary coil 11, the matching circuit 13, and the capacitor 14 may be regarded as a power unit.

The power transmitting apparatus 80 also includes an antenna 16. The antenna 16 may be an antenna which can be used for a short-range wireless communication such as Bluetooth (Registered Trademark). The power transmitting apparatus 80 includes the antenna 16 to receive, from a power receiving unit 100A included in the electronic device 200A (or a power receiving unit 100B included in the electronic device 200B), data indicating that, for example, the number of turns of a secondary coil 120A (or 120B) is changed. The received data is entered to the controller 310. The controller 310 and the antenna 16 are an example of a transmitting side communication unit.

Each of the electronic devices 200A and 200B is, for example, a terminal such as a tablet computer or a smartphone. The electronic device 200A includes the power receiving unit 100A, a DC-DC converter 210A and a battery 220A. The electronic device 200B includes the power receiving unit 100B, a DC-DC converter 210B and a battery 220B.

The power receiving units 100A and 100B are configured with respectively designating an antenna 170A and an antenna 170B with respect to the power receiving unit 100 illustrated in FIG. 2. Each of the DC-DC converters 210A and 210B is the same as the DC-DC converter 210 illustrated in FIG. 2 (Note that the DC-DC converter is described as a "DCDC" in FIG. 3). Each of the batteries 220A and 220B is also the same as the battery 220 illustrated in FIG. 2.

The power receiving unit 100A includes a secondary resonant coil 110A, a secondary coil 120A, a rectification circuit 130A, a smoothing capacitor 140A, a controller 150A, and an antenna 170A. The secondary resonant coil 110A, the secondary coil 120A, the rectification circuit 130A, the smoothing capacitor 140A, and the controller 150A respectively correspond to the secondary resonant coil 110, the secondary coil 120, the rectification circuit 130, the smoothing capacitor 140, and the controller 150, illustrated in FIG. 2. Note that each of the secondary resonant coil 110A, the secondary coil 120A, the rectification circuit 130A, and the smoothing capacitor 140A is illustrated in a simplified manner in FIG. 3. Also, illustration of the output terminals 160A and 160B and the voltage detector 160V is omitted in FIG. 3.

The power receiving unit 100B includes a secondary resonant coil 110B, a secondary coil 120B, a rectification circuit 130B, a smoothing capacitor 140B, a controller 150B, and an antenna 170B. The secondary resonant coil 110B, the secondary coil 120B, the rectification circuit 130B, the smoothing capacitor 140B, and the controller 150B respectively correspond to the secondary resonant coil 110, the secondary coil 120, the rectification circuit 130, the smoothing capacitor 140, and the controller 150, illustrated in FIG. 2. Note that each of the secondary resonant coil 110B, the secondary coil 120B, the rectification circuit 130B, and the smoothing capacitor 140B is illustrated in a simplified manner in FIG. 3. Also, illustration of the output terminals 160A and 160B and the voltage detector 160V is omitted in FIG. 3.

The antennas 170A and 170B may be an antenna which can be used for a short-range wireless communication such as Bluetooth (Registered Trademark). The power receiving units 100A and 100B respectively include the antennas 170A and 170B to perform data communication with the power transmitting unit 300, and are respectively connected to the controller 150A in the power receiving unit 100A and the controller 150B in the power receiving unit 100B.

The controller 150A in the power receiving unit 100A sends data indicating that, for example, the number of turns of a secondary coil 120A is changed, to the power transmitting unit 300 via the antenna 170A. Similarly, the controller 150B in the power receiving unit 100B sends data indicating that, for example, the number of turns of a secondary coil 120B is changed, to the power transmitting unit 300 via the antenna 170B.

The electronic devices 200A and 200B can charge the batteries 220A and 220B respectively without contact with the power transmitting apparatus 80, by simply placing the electronic devices 200A and 200B near the power transmitting apparatus 80. The batteries 220A and 220B can be charged simultaneously.

Out of the components illustrated in FIG. 3, the power transmission system 500 is configured by the power transmitting unit 300, the power receiving unit 100A, and the power receiving unit 100B. That is, the power transmitting apparatus 80, the electronic devices 200A and 200B are using the power transmission system 500 realizing a contactless electric power transmission using magnetic resonance.

Figure 4:
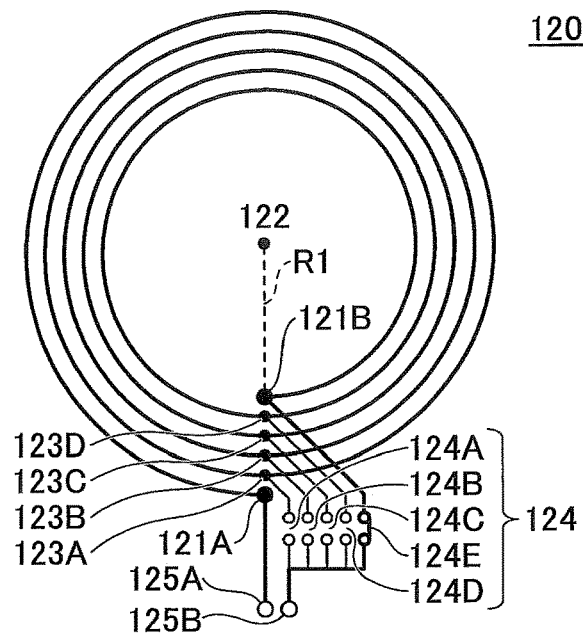
FIG. 4 is a diagram illustrating a structure of a secondary coil.
Figure 5:
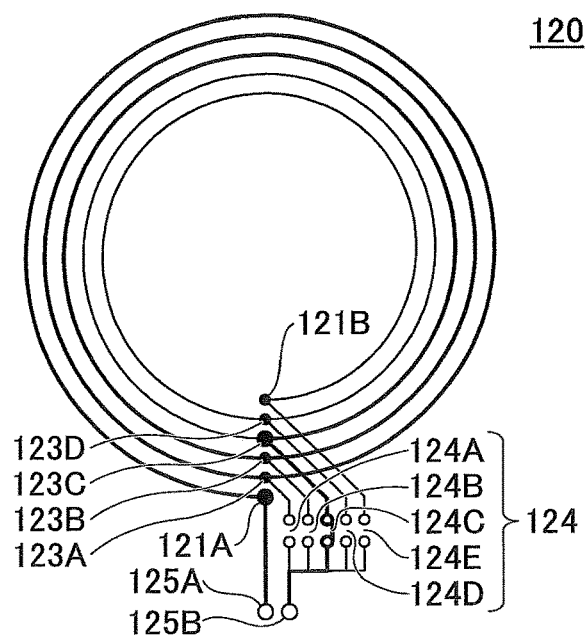
FIG. 5 is a diagram illustrating a structure of the secondary coil.

FIGS. 4 and 5 are diagrams illustrating a structure of the secondary coil 120. As illustrated in FIG. 4, the secondary coil 120 includes a pair of terminals 121A and 121B, and a winding (metal wire) from the terminal 121A to the terminal 121B is coiled spirally. The terminals 121A and 121B are on a line R1 passing through to a center 122 of the secondary coil 120. The winding of the secondary coil 120 is spirally wound 5 times at constant spacing from the terminal 121A to the terminal 121B.

The secondary coil 120 also includes terminals 123A, 123B, 123C, and 123D located on the line passing through the terminals 121A and 121B and to the center 122. The terminals 123A, 123B, 123C, and 123D are on the line R1 between the terminal 121A and the terminal 121B, in an order of the terminals 123A, 123B, 123C, and 123D.

The secondary coil 120 further includes a switch 124, and terminals 125A and 125B. The switch 124 includes switch units 124A, 124B, 124C, 124D, and 124E. The switch units 124A, 124B, 124C, 124D, and 124E are respectively connected at one end to the terminals 123A, 123B, 123C, 123D, and 121B, and are each connected at the other end to the terminal 125B. Further, the terminal 125A is connected to the terminal 121A.

As illustrated in FIG. 4, if the switch unit 124E is closed (is turned on), and the switch units 124A, 124B, 124C, and 124D are opened (are turned off), the secondary coil 120 becomes a 5-turn coil from the terminal 121A to the terminal 121B.

As illustrated in FIG. 5, if the switch unit 124C is closed (is turned on), and the switch units 124A, 124B, 124D, and 124E are opened (are turned off), the secondary coil 120 becomes a 3-turn coil from the terminal 121A to the terminal 123C.

Similarly, if the switch unit 124A is closed (is turned on), and the switch units 124B, 124C, 124D, and 124E are opened (are turned off), the secondary coil 120 becomes a 1-turn coil from the terminal 121A to the terminal 123A. If the switch unit 124B is closed (is turned on), and the switch units 124A, 124C, 124D, and 124E are opened (are turned off), the secondary coil 120 becomes a 2-turn coil from the terminal 121A to the terminal 123B. Further, if the switch unit 124D is closed (is turned on), and the switch units 124A, 124B, 124C, and 124E are opened (are turned off), the secondary coil 120 becomes a 4-turn coil from the terminal 121A to the terminal 123D.

By selecting any one of the switch units 124A, 124B, 124C, 124D, and 124E and closing (turning on) the selected switch unit, the number of turns of the secondary coil 120 can be changed. On/off control of the switch units 124A, 124B, 124C, 124D, and 124E in the switch 124 is performed by the controller 150. In the following description, the on/off control of the switch units 124A, 124B, 124C, 124D, and 124E is referred to as "on/off control of the switch 124".

By performing on/off control of the switch 124, the controller 150 can change output voltage of the secondary coil 120. When the output voltage of the secondary coil 120 is changed, the input voltage of the DC-DC converter 210 and a load resistance are also changed.

Next, with reference to FIGS. 6 and 7, an operation when the number of turns of the secondary coil 120 (120A or 120B) is changed will be described. FIGS. 6 and 7 illustrate states in which the power receiving unit 100A is receiving electric power (or the power receiving units 100A and 100B are receiving electric power) from the primary resonant coil 12. Note that the power receiving units 100A and 100B are illustrated in a simplified manner in FIGS. 6 and 7. Specifically, the power receiving unit 100A is represented as a set of two coils corresponding to the secondary resonant coil 110A and the secondary coil 120A, and the power receiving unit 100B is represented as a set of two coils corresponding to the secondary resonant coil 110B and the secondary coil 120B.

Figure 6C:
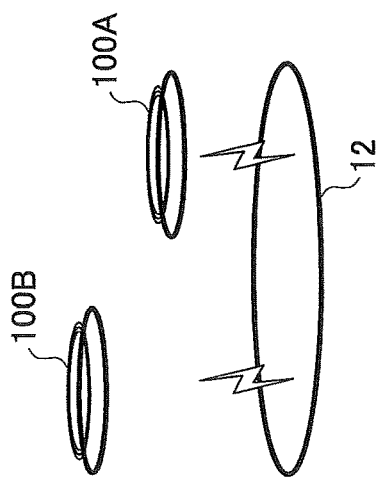
FIGS. 6A, 6B, 6C, 7A and 7B illustrate states in which one or more power receiving units are receiving electric power from a primary resonant coil.
Figure 6B:
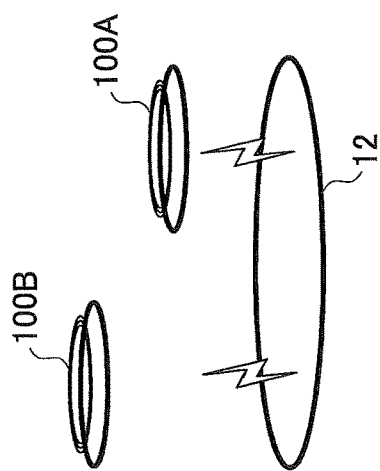
Figure 6A:
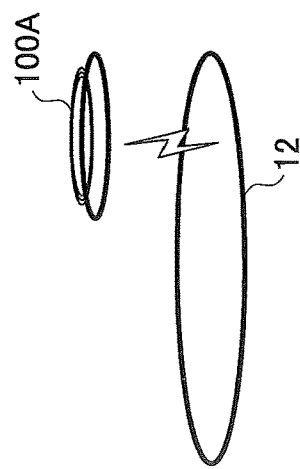

In a state in which only the power receiving unit 100A is receiving electric power from the primary resonant coil 12 as illustrated in FIG. 6A, the power receiving unit 100A may be configured such that only the power receiving unit 100A can receive electric power most effectively. In the following description, suppose that the power receiving unit 100A can receive electric power most effectively when the number of turns of the secondary coil 120A is 3. Also in this case, let the power received by the power receiving unit 100A be P1, and let the input voltage of the DC-DC converter 210A be Vin1.

Next, when the power receiving unit 100B joins as illustrated in FIG. 6B, the power transmitting apparatus 80 (see FIG. 3) increases the transmitting power. The DC-DC converter 210A of the power receiving unit 100A increases the load resistance such that the receiving power does not change from the state when only the power receiving unit 100A was receiving the electric power.

Here, the power received by the power receiving unit 100A and the input voltage of the DC-DC converter 210A in a state illustrated in FIG. 6B are referred to as P2 and Vin2 respectively. Because the power receiving unit 100A charges the battery 220A (see FIG. 3) by receiving the same electric power as the state in FIG. 6A, P2 is equal to P1, which is the power received by the power receiving unit 100A in a state illustrated in FIG. 6A.

With respect to Vin2, because P2 is equal to P1 and the load resistance of the DC-DC converter 210A becomes larger, Vin2 (the input voltage of the DC-DC converter 210A) becomes larger than Vin1.

In the state in FIG. 6B, if Vin2 increases excessively, there is a risk that the input voltage of the DC-DC converter 210A exceeds the upper limit. Therefore, the power receiving unit 100A decreases the number of turns of the secondary coil 120A to reduce Vin2.

Suppose that the number of turns of the secondary coil 120A is reduced to two in a state illustrated in FIG. 6C. The input voltage of the DC-DC converter 210A (referred to as "Vin3") in the state illustrated in FIG. 6C becomes less than Vin2. In addition, since the power received by the power receiving unit 100A in the state in FIG. 6C (referred to as "P3") is equal to P2 (or P1), the load resistance also decreases.

By controlling the number of turns of the secondary coil 120 as described above, the input voltage of the DC-DC converter 210A can be controlled so as not to exceed the upper limit.

Figure 7A:
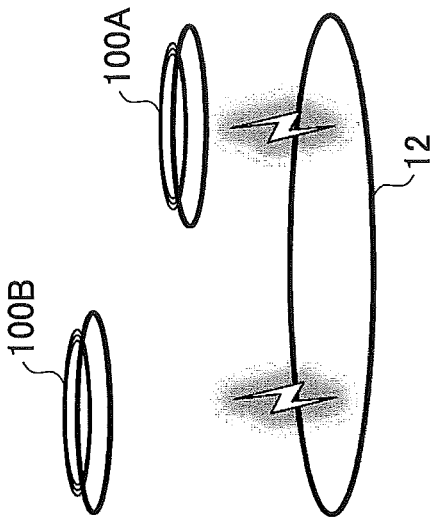

FIG. 7A illustrates a state in which the power receiving units 100A and 100B are receiving electric power from the primary resonant coil 12 and the number of turns of the secondary coils 120A and 120B are respectively set to 2 and 3 that are the optimal numbers for the secondary coils 120A and 120B. If the number of turns of the secondary coils 120A and 120B are optimal for both, the power receiving units 100A and 100B can continue receiving power without changing the number of turns of the secondary coils 120A and 120B.

Figure 7B:
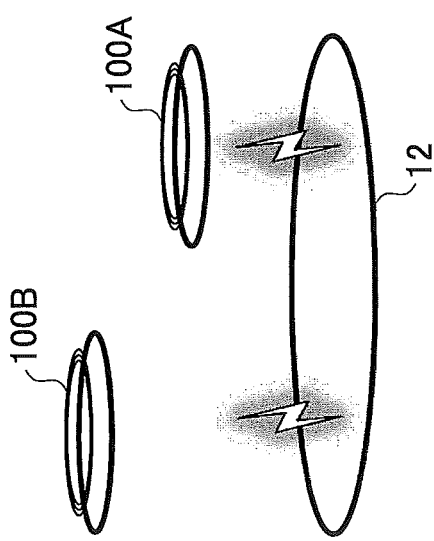

FIG. 7B also illustrates a state in which the power receiving units 100A and 100B are receiving electric power from the primary resonant coil 12. However, in the state illustrated in FIG. 7B, the number of turns of both the secondary coils 120A and 120B are reduced to 2 because the transmitting power is in excess. If the number of turns is reduced as illustrated here, the power transmitting unit 300 reduces the transmitting power.

After reducing the transmitting power, if at least one of the power receiving units returns the number of turns to the optimal number, the power transmitting unit 300 stops reducing the transmitting power. For example, when the state of the power receiving units are such that the number of turns of the secondary coils 120A and 120B are reduced to 2 as illustrated in FIG. 7B, if the power receiving unit 100B returns the number of turns to 3, the power transmitting unit 300 stops reducing the transmitting power.

Figure 8:
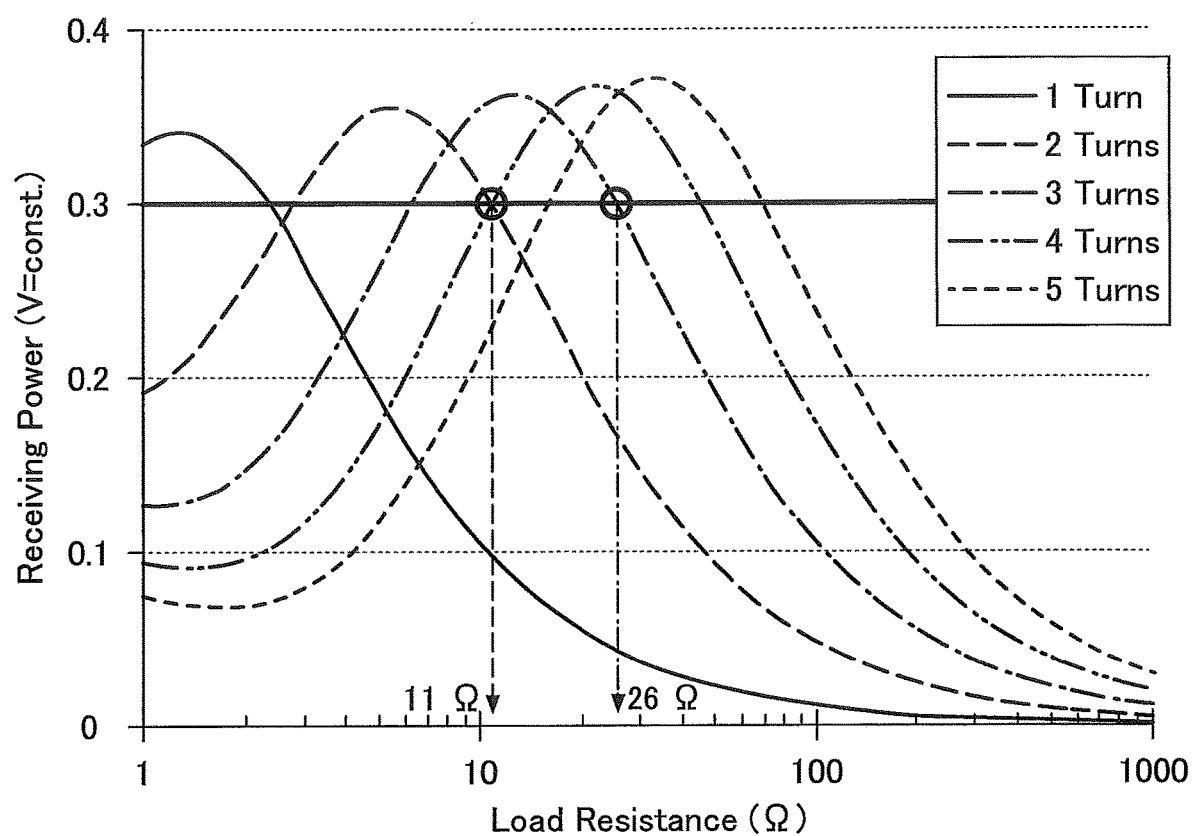
FIG. 8 is a graph illustrating relation between a load resistance of a DC-DC converter and receiving power of the power receiving unit when the number of turns of the secondary coil is set to 1, 2, 3, 4, and 5.

FIG. 8 is a graph illustrating a relation between the load resistance of the DC-DC converter 210 and the receiving power of the power receiving unit 100, when the number of turns of the secondary coil 120 is set to 1, 2, 3, 4, and 5. A horizontal axis represents the load resistance of the DC-DC converter 210, and a vertical axis represents the normalized receiving power of the power receiving unit 100. Note that a receiving voltage of the power receiving unit 100 is constant.

When the number of turns of the secondary coil 120 is changed from 1 to 5, the resonant state between the primary resonant coil 12 and the secondary coil 120 is changed. In addition, as impedance of the secondary coil 120 is also changed, the load resistance at which the receiving power is maximized changes. As the number of turns increases, characteristics curves of the receiving power shift to the right (to the direction of higher resistance) in the graph.

For example, when the receiving power is 0.3 and the number of turns of the secondary coil 120 is 3, the load resistance is 26Ω. Further, when the receiving power is 0.3 and the number of turns of the secondary coil 120 is 2, the load resistance is 11Ω. As described here, when the receiving power is constant, the load resistance can be changed by changing the number of turns. If the number of turns is reduced, the load resistance becomes lower.

It should be noted that two load resistance values may be present to attain desired receiving power. For example, in FIG. 8, when the receiving power is 0.3 and the number of turns is 3, the load resistance is 26Ω or 11Ω. Also, when the number of turns is 2, the load resistance is 11Ω or 2.5Ω. In these cases, the load resistance higher than the load resistance corresponding to a peak of the receiving power (a load resistance when the electric power received from the primary resonant coil is maximum) is adopted (26Ω and 11Ω in the above cases). Because the DC-DC converter 210 is a step-down DC-DC converter, when the load resistance is smaller than a load resistance corresponding to a peak of the receiving power, the input voltage to attain the desired receiving power may be smaller than the lower limit.

Figure 9:
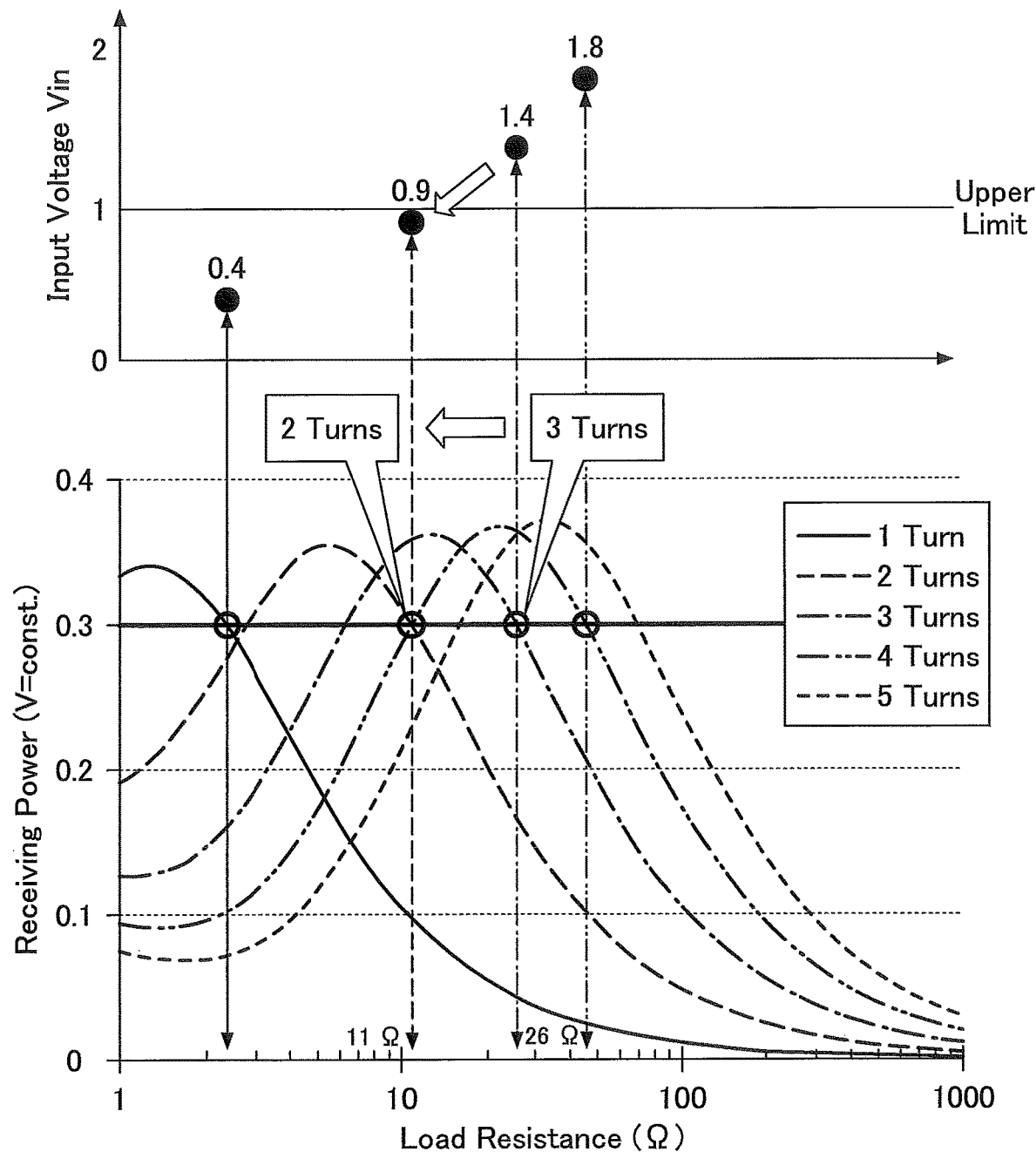
FIG. 9 is a graph in which an input voltage of the DC-DC converter is added to the graph illustrated in FIG. 8.

FIG. 9 is a graph in which the input voltage of the DC-DC converter 210 (Vin) is added to the graph illustrated in FIG. 8. Note that values of the input voltage Vin illustrated in FIG. 9 are normalized values.

The receiving power P does not change before and after changing the number of turns of the secondary coil 120. Further, the relation among the receiving power P, the input voltage Vin, and the load resistance R can be expressed as "$P=V_{in}^2/R$". Therefore, when the load resistance R increases, the input voltage Vin also increases. When the load resistance R decreases, the input voltage Vin also decreases.

For example, in a case in which the receiving power is 0.3, if the number of turns of the secondary coil 120 is 4, the load resistance is 45Ω. Further, if the number of turns of the secondary coil 120 is 3, the load resistance is 26Ω. Further, if the number of turns of the secondary coil 120 is 2, the load resistance is 11Ω, and if the number of turns of the secondary coil 120 is 1, the load resistance is 2.2Ω.

In such a case, the input voltage of the DC-DC converter 210 (Vin) and the number of turns of the secondary coil 120 are in the following relation: If the number of turns of the secondary coil 120 is 4, the input voltage Vin is 1.8. If the number of turns of the secondary coil 120 is 3, the input voltage Vin is 1.4. If the number of turns of the secondary coil 120 is 2, the input voltage Vin is 0.9. And, if the number of turns of the secondary coil 120 is 1, the input voltage Vin is 0.4. That is, when the number of turns is reduced, the input voltage can be reduced.

For example, when the upper limit of the input voltage Vin is 1, and if the input voltage Vin is about to exceed the upper limit (1) when the number of turns of the secondary coil 120 is 3, the number of turns of the secondary coil 120 should be decreased to 2.

To determine the appropriate number of turns, the power receiving unit 100 should maintain data representing the relation between the load resistance of the DC-DC converter 210 and the receiving power of the power receiving unit 100 for each number of turns of the secondary coil 120, as illustrated in FIG. 8 or FIG. 9, in the memory 150M of the controller 150.

Figure 10:
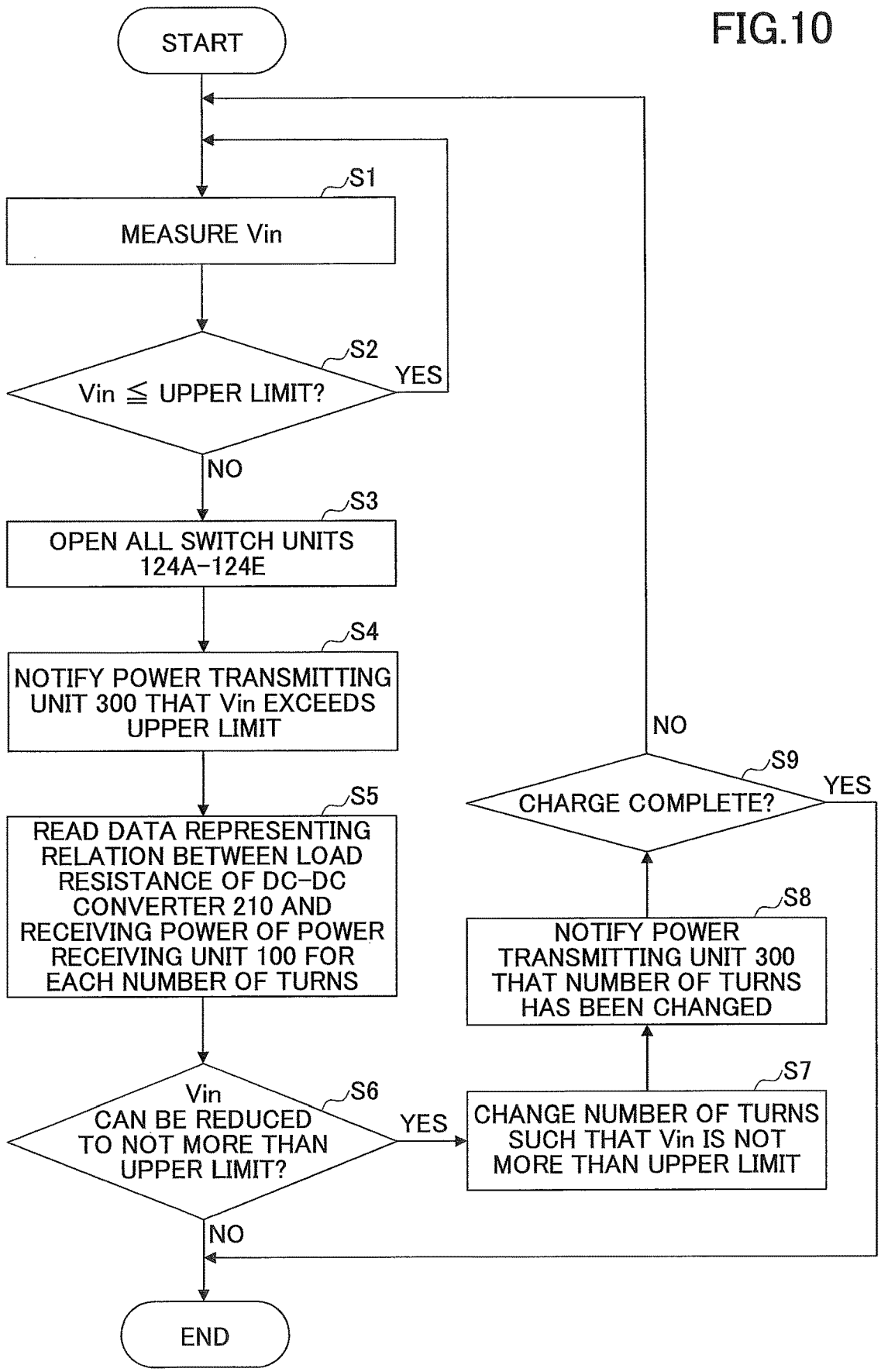
FIG. 10 is a flowchart describing a process performed by a controller in the power receiving unit.

FIG. 10 is a flowchart describing the process performed by the controller 150 in the power receiving unit 100. The flowchart illustrated in FIG. 10 represents a method for controlling the power receiving unit 100.

When power of the power receiving unit 100 is turned on, the process is started. Note that, when the process is started, the number of turns of the secondary coil 120 of the power receiving unit 100 is set to the optimal value in a case in which the power receiving unit 100 receives power alone. An example of the optimal value is 3.

Further, the power transmitting unit 300 periodically performs wireless communication with the power receiving unit 100 to control the transmitting power such that the receiving power of the power receiving unit 100 is not less than the lower limit of the input voltage of the DC-DC converter 210.

The controller 150 measures the input voltage of the DC-DC converter 210 (Vin) (step S1). The input voltage Vin may be measured with the voltage detector 160V.

The controller 150 determines whether the input voltage Vin is not more than the upper limit or not (step S2). Information concerning the upper limit may be stored in the memory 150M of the controller 150 in advance.

If the controller 150 determines that the input voltage Vin is not more than the upper limit (S2:YES), the process reverts to step S1.

If it is determined that the input voltage Vin is more than the upper limit (S2:NO), the controller 150 opens (turns off) all of the switch units 124A to 124E (step S3). Because the input voltage Vin has exceeded the upper limit, step S3 is performed to prevent the DC-DC converter 210 from being damaged.

Next, the controller 150 sends data, indicating that the input voltage Vin has exceeded the upper limit, to the power transmitting unit 300 (step S4). The controller 150 sends data to the power transmitting unit 300 via the antenna 170.

Next, the controller 150 reads, from the memory 150M of the controller 150, data representing the relation between the load resistance of the DC-DC converter 210 and the receiving power of the power receiving unit 100 for each number of turns of the secondary coil 120 (step S5).

Next, the controller 150 determines whether the input voltage Vin can be reduced to not more than the upper limit by reducing the number of turns of the secondary coil 120 (step S6). The controller 150, by using data representing the relation between the receiving power P and the load resistance R, calculates the input voltage Vin (when the number of turns is less than the current number of turns), and determines whether the input voltage Vin can be reduced to not more than the upper limit by reducing the number of turns of the secondary coil 120.

As the receiving power P is determined depending on a rated output of the battery 220, data representing the receiving power P may be stored in the memory 150M of the controller 150 in advance. Further, in the memory 150M of the controller 150, the input voltage Vin may also be stored in advance in association with the data representing the relation between the load resistance of the DC-DC converter 210 and the receiving power of the power receiving unit 100 for each number of turns of the secondary coil 120, as illustrated in FIG. 9.

If it is determined that the input voltage Vin can be reduced to not more than the upper limit (S6:YES), the controller 150 changes the number of turns of the secondary coil 120 such that the input voltage Vin is not more than the upper limit (step S7). Specifically, the controller 150 changes the on/off state of the switch units 124A to 124E in the switch 124 to change the number of turns of the secondary coil 120. If, at step S6, multiple candidates of the number of turns of the winding of the secondary coil 120 are present such that the input voltage of the DC-DC converter (Vin) does not exceed the upper limit, the controller 150 may select one of the number of turns of the winding of the secondary coil 120 satisfying a condition such that the load resistance of the DC-DC converter 210 at the receiving power P is higher than a load resistance when the electric power received from the primary resonant coil is maximum.

The controller 150 sends, to the power transmitting unit 300, data indicating that the number of turns has been changed (step S8). This data includes the number of decreased turns, or the number of increased turns.

The controller 150 determines whether charging is completed or not (step S9). The controller 150 determines whether charging is completed or not by determining if the battery 220 is fully charged, based on the state of charge of the battery 220.

If the controller 150 determines that charging has not been completed (S9:NO), the process reverts to step S1.

If it is determined that charging has been completed (S9:YES), the controller 150 terminates the process (END). After terminating the process, the power receiving unit 100 no longer performs charging.

Also, when it is determined that the input voltage Vin cannot be reduced to not more than the upper limit (S6:NO), the controller 150 terminates the process (END).

Figure 11:
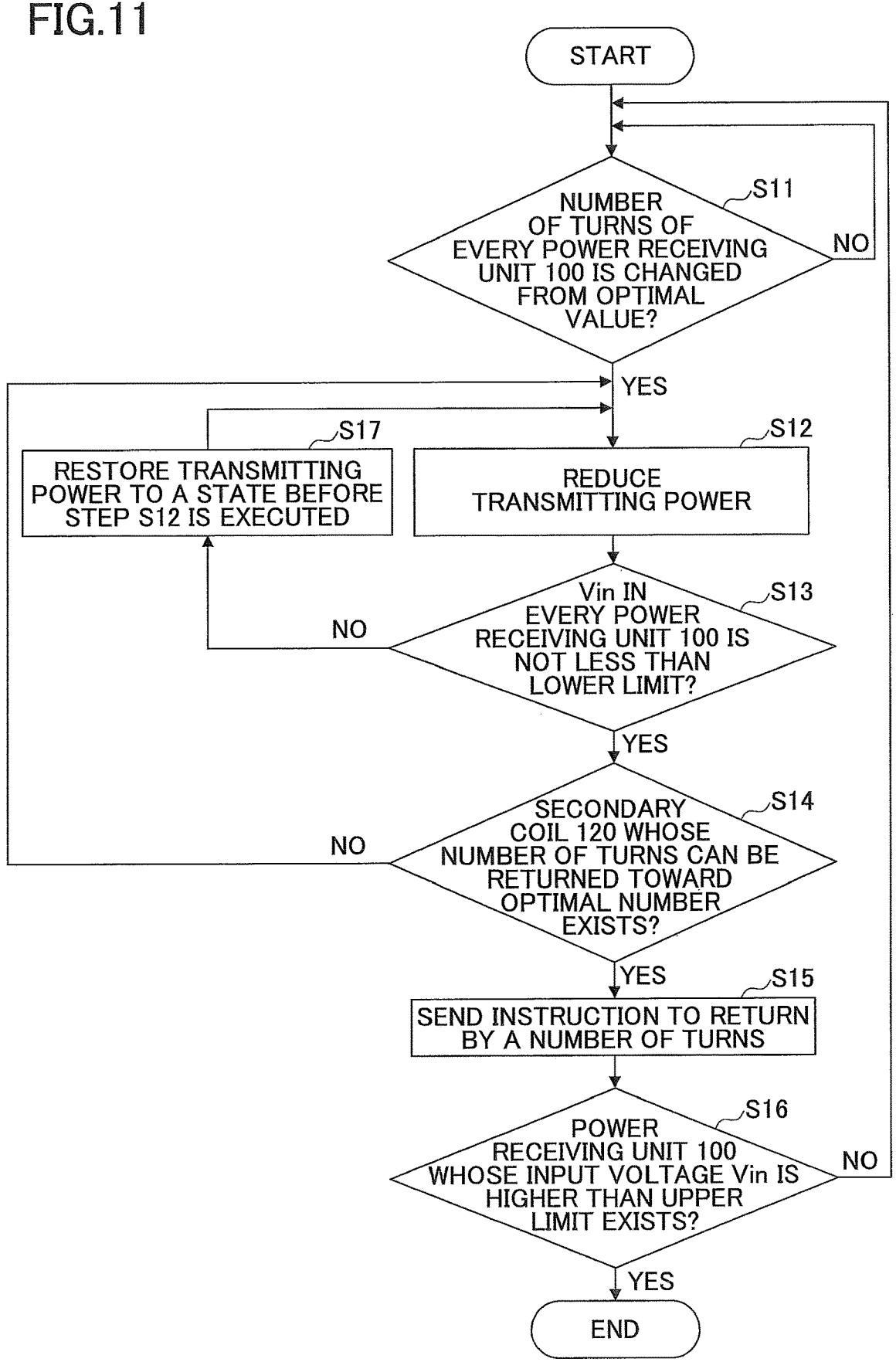
FIG. 11 is a flowchart describing a process performed by a controller in a power transmitting unit.

FIG. 11 is a flowchart describing the process performed by the controller 310 in the power transmitting unit 300.

When power of the power transmitting unit 300 is turned on, the process is started.

The controller 310 determines whether the number of turns of the secondary coil 120 in every power receiving unit 100 has been changed from the optimal value or not (step S11). As the power transmitting unit 300 receives, from each of the power receiving units 100, the data indicating that the number of turns has been changed, the power transmitting unit 300 can recognize whether the number of turns has been changed from the optimal value or not.

If it is determined that the number of turns of the secondary coil 120 in every power receiving unit 100 has been changed from the optimal value (S11:YES), the controller 310 reduces the transmitting power (step S12). An amount of power to be reduced at step S12 is determined in advance. Accordingly, when reducing the transmitting power, a predetermined amount of power is reduced.

Next, the controller 310 determines whether the input voltage of the DC-DC converter 210 (Vin) in every power receiving unit 100 is not less than the lower limit or not (step S13). The controller 310 performs the determination by receiving information from each of the power receiving units 100.

If it is determined that the input voltage of the DC-DC converter 210 (Vin) in every power receiving unit 100 is not less than the lower limit (S13:YES), the controller 310 determines whether there is a power receiving unit 100 having a secondary coil 120 whose number of turns can be returned toward the optimal number (step S14).

As to the determination of the existence of a power receiving unit 100 having a secondary coil 120 whose number of turns can be returned toward the optimal number, the controller 310 may make an inquiry to the power receiving unit 100 through data communication to cause the power receiving unit 100 to perform determination similar to step S6. After performing the determination similar to step S6, the power receiving unit 100 sends a determination result to the power transmitting unit 300, and the controller 310 may perform the determination at step S14 based on the determination result.

Alternatively, the controller 310 may maintain data representing the relation between the load resistance of the DC-DC converter 210 and the receiving power of the power receiving unit 100 for each number of turns of the secondary coil 120, as illustrated in FIG. 8 or FIG. 9, in the internal memory of the controller 310. In this case, the controller 310 itself may perform the determination similar to step S6 without making an inquiry to the power receiving unit 100, to perform step S14.

If it is determined that there is a power receiving unit 100 having a secondary coil 120 whose number of turns can be returned toward the optimal number (S14:YES), the controller 310 sends, to the power receiving unit 100 having a secondary coil 120 whose number of turns can be returned toward the optimal number, an instruction to return by a certain number of turns (step S15). The power receiving unit 100 having received the instruction returns the number of turns of the secondary coil 120 by 1 toward the optimal number.

Next, the controller 310 determines whether a power receiving unit 100 whose input voltage of the DC-DC converter 210 (Vin) is higher than the upper limit exist (step S16). As the power transmitting unit 300 receives, from each of the power receiving units 100, the data indicating that the input voltage Vin has exceeded the upper limit, the power transmitting unit 300 can make the determination based on whether the data is received or not.

If it is determined that a power receiving unit 100 whose input voltage of the DC-DC converter 210 (Vin) is higher than the upper limit exists (S16:YES), the controller 310 stops transmitting power (END).

If the controller 310 determines that no power receiving unit 100 whose input voltage of the DC-DC converter 210 (Vin) is higher than the upper limit exists (S16:NO), the process reverts to step S11 to repeat the process from step 11 again.

Further, if the controller 310 determines at step S14 that there is no power receiving unit 100 having a secondary coil 120 whose number of turns can be returned toward the optimal number (S14:NO), the process reverts to step S12 to reduce the transmitting power.

Further, if the controller 310 determines that the input voltage of the DC-DC converter 210 (Vin) of any one of the power receiving units 100 is less than the lower limit (S13:NO), the controller 310 restores the transmitting power to a state before step S12 is executed (step S17).

Further, if it is determined that the number of turns of the secondary coil 120 of at least one of the power receiving unit 100 has not been changed (or if it is determined that the number of turns of the secondary coil 120 of at least one of the power receiving units 100 has returned to the optimal value) (S11:NO), the controller 310 repeats step S11 to wait until the number of turns of the secondary coil 120 in every power receiving unit 100 has been changed.

The process performed by the controller 310 is described as above.

As described above, when the input voltage of the DC-DC converter 210 (Vin) is more than the upper limit in the power receiving unit 100 according to the present embodiment, and if it is determined that the input voltage Vin can be reduced to not more than the upper limit by reducing the number of turns of the secondary coil 120, the power receiving unit 100 changes the on/off state of the switch 124 to reduce the number of turns.

By reducing the number of turns, an output voltage of the secondary coil 120 decreases. Accordingly, the load resistance of the DC-DC converter 210 as seen by the input terminals 211A and 211B is reduced and the input voltage of the DC-DC converter 210 (Vin) can be reduced. Therefore, an effective power transmission can be realized between the power receiving unit 100 and the power transmitting unit 300 without exceeding the input voltage of the DC-DC converter 210 (Vin).

According to the above described embodiment, the power receiving unit 100 capable of performing an effective power transmission with the power transmitting unit 300, the power transmission system, and the method of controlling the power receiving unit can be provided.

Figure 12:
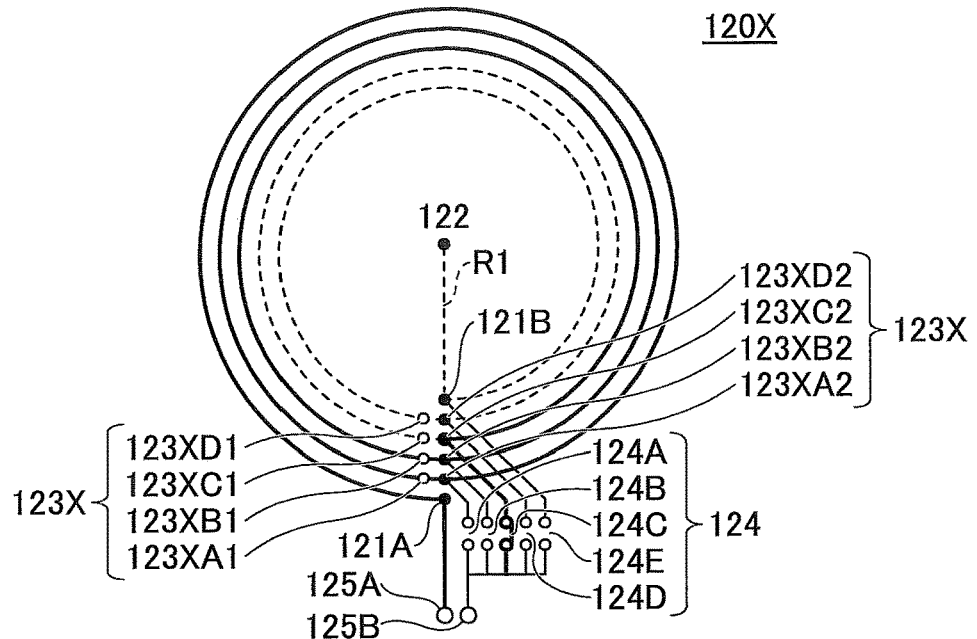
FIGS. 12 and 13 are diagrams illustrating a structure of a secondary coil according to a modified example of the embodiment.
Figure 13:
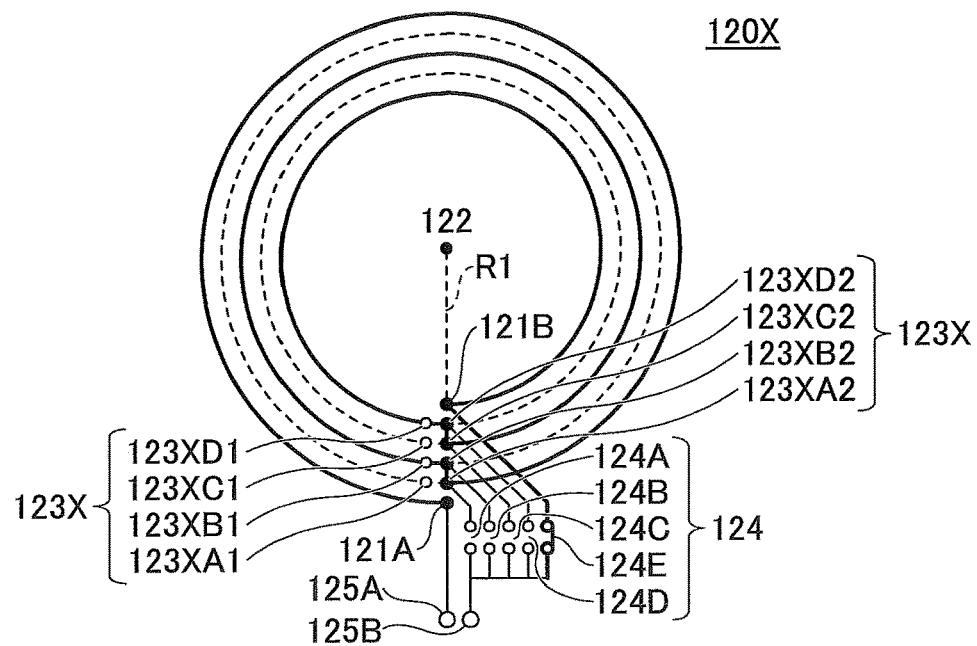

FIGS. 12 and 13 are diagrams illustrating a structure of a secondary coil 120X according to a modified example of the above embodiment. As illustrated in FIG. 12, the secondary coil 120X is configured by replacing the terminals 123A to 123D of the secondary coil 120 illustrated in FIG. 4 with a switch 123X.

The switch 123X includes terminals 123XA1, 123XB1, 123XC1, 123XD1, 123XA2, 123XB2, 123XC2, and 123XD2. Each of the terminals is connectable to other terminals adjacent in a circumference direction or a radial direction of the secondary coil 120X. Note that the terminals 123XA1 to 123XD1 are respectively located at the same positions as positions of the terminals 123A to 123D in FIG. 4.

The terminals 123XA2 to 123XD2 are respectively arranged at positions adjacent to the right sides of the terminals 123XA1 to 123XD1 along the secondary coil 120X that is coiled spirally.

The terminals 123XA2 to 123XD2 are respectively connectable to the terminals 123XA1 to 123XD1. Also, each of the terminals 123XA2 to 123XD2 is connectable to other terminals adjacent in the radial direction of the secondary coil 120X.

For example, as illustrated in FIG. 12, if the terminal 123XA1 is connected to the terminal 123XA2, the terminal 123XB1 is connected to the terminal 123XB2, and the switch unit 124C is closed (is turned on), a 3-turn coil spanning from the terminal 121A to the terminal 123XC2 is obtained. In FIG. 12, a range from the terminal 121A to the terminal 123XC2 (the range included in the 3-turn coil) is illustrated as a solid line, and a range from the terminal 123XC1 to the terminal 121B (which is not included in the 3-turn coil) is illustrated as a dashed line.

The obtained coil is a 3-turn coil, and a pitch of the winding is equal to a pitch of adjacent windings of the secondary coil 120X. In the following, this type of pitch is referred to as "pitch-1".

Further, as illustrated in FIG. 13, if the terminal 123XA2 is connected to the terminal 123XB1 the terminal 123XB2 is connected to the terminal 123XC2, the terminal 123XD1 is connected to the terminal 123XD2, and the switch unit 124E is closed (is turned on), a coil spanning from the terminal 121A to the terminal 121B is obtained. A conductive path of the coil includes a path starting from the terminal 121A to the terminal 123XA2 along the winding of the secondary coil 120X, a path from the terminal 123XA2 to the terminal 123XB2, a path from the terminal 123XB2 to the terminal 123XC2 along the winding of the secondary coil 120X, a path from the terminal 123XC2 to the terminal 123XD2, and a path from the terminal 123XD2 to the terminal 121B along the winding of the secondary coil 120X.

In FIG. 13, a range included in the obtained coil is illustrated as a solid line, and a range not included in the obtained coil is illustrated as a dashed line.

Though the obtained coil illustrated in FIG. 13 is also a 3-turn coil similar to FIG. 12, a pitch in the radial direction is doubled as compared to the coil illustrated in FIG. 12. In the following, this pitch is referred to as "pitch-2".

When comparing pitch-1 and pitch-2, the pitch of the windings constituting the coil (illustrated as a solid line) in the radial direction differs. Because of the pitch difference, an output voltage of the coil illustrated in FIG. 12 is different from an output voltage of the coil illustrated in FIG. 13 even when both of the coils receive the same electric power from the secondary resonant coil 110.

That is, by changing the pitch of the secondary coil 120 instead of changing the number of turns, the input voltage of the DC-DC converter 210 (Vin) can also be changed similarly to the secondary coil 120 illustrated in FIG. 4 or FIG. 5.

Figure 14:
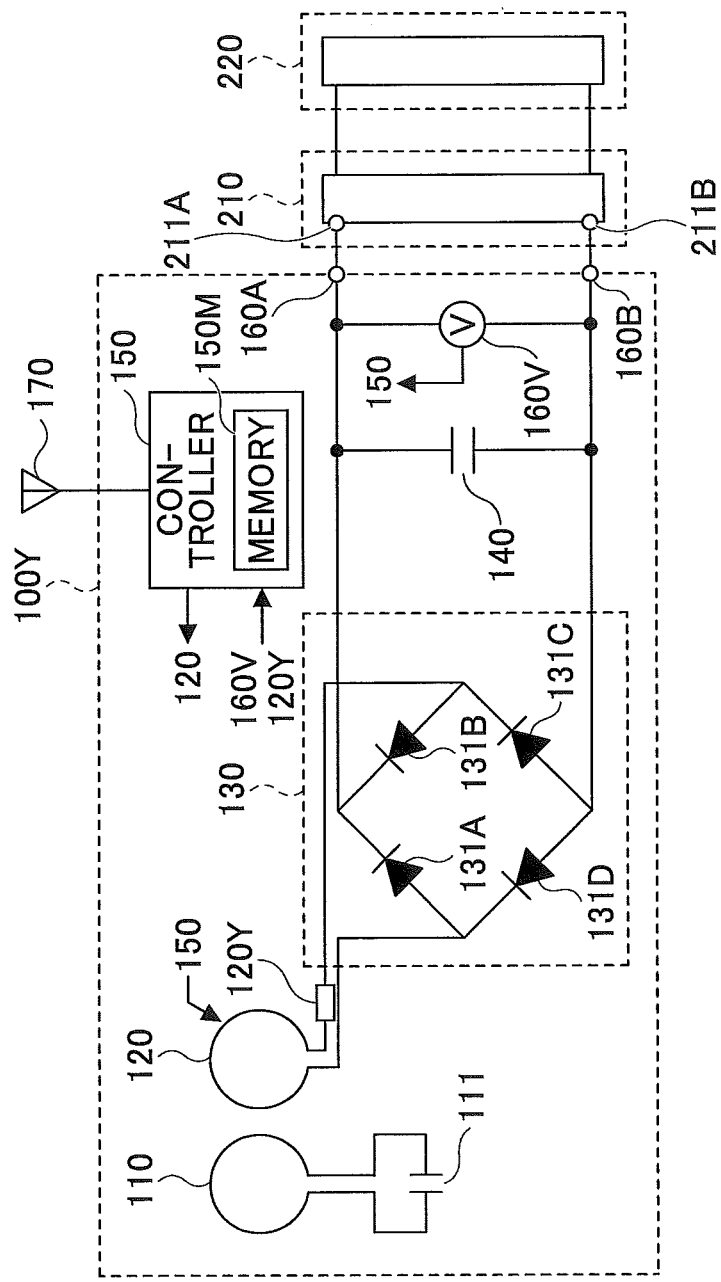
FIG. 14 is a diagram illustrating a power receiving unit according to a modified example of the embodiment.

In the above embodiment, a case in which the receiving power of the power receiving unit 100 is determined depending on a rated output of the battery 220 is described. However, if a rated output of the battery 220 is not determined, the receiving power of the power receiving unit 100 may be measured. Like a power receiving unit 100Y illustrated in FIG. 14 for example, a wattmeter 120Y for measuring receiving power by detecting a voltage and a current of the secondary coil 120 may be installed to the secondary coil 120. And, the power receiving unit 100Y may be configured such that data representing the receiving power measured by the wattmeter 120Y is output to the controller 150 and that the controller 150 changes the number of turns based on the data representing the receiving power input from the wattmeter 120Y.

All examples and conditional language provided herein are intended for pedagogical purposes of aiding the reader in understanding the invention and the concepts contributed by the inventors to further the art, and are not to be construed as limitation to such specifically recited examples and conditions, nor does the organization of such examples in the specification relate to a showing of superiority and inferiority of the invention. Although one or more embodiments of the present invention have been described in detail, it should be understood that various changes, substitutions, and alterations could be made hereto without departing from the spirit and scope of the invention.

What is claimed is:

1. A power receiving unit comprising:
   a secondary resonant coil configured to receive electric power from a primary resonant coil using magnetic resonance or electric field resonance occurring between the primary resonant coil and the secondary resonant coil;
   a secondary coil capable of changing a number of turns or a pitch of a winding, the secondary coil being configured to receive the electric power from the secondary resonant coil using electromagnetic induction;

a rectification circuit connected to an output side of the secondary coil configured to perform rectification of an alternating current power output from the secondary coil;

a smoothing circuit connected to an output side of the rectification circuit;

an output terminal for connecting an output side of the smoothing circuit with a DC-DC converter;

a storage unit for storing data representing an association between a load resistance of the DC-DC converter and the electric power received from the primary resonant coil, the data representing the association being stored for each number of turns or each of the pitches of the winding; and a controller configured to determine the number of turns or the pitch of the winding of the secondary coil such that the input voltage of the DC-DC converter does not exceed the upper limit, by calculating, for each number of turns or each of the pitches of the winding, the input voltage of the DC-DC converter when the electric power received from the primary resonant coil is a predetermined magnitude, based on the data in the storage unit; and control the number of turns or the pitch of the winding of the secondary coil to the determined number of turns or the determined pitch.

2. The power receiving unit according to claim 1, further comprising a power detecting unit configured to measure the electric power received from the primary resonant coil, wherein the predetermined magnitude is a magnitude of the electric power measured by the power detecting unit.

3. The power receiving unit according to claim 1, wherein the DC-DC converter is a step-down DC-DC converter, and in a case in which a plurality of candidates of the number of turns or the pitch of the winding of the secondary coil are present such that the input voltage of the DC-DC converter does not exceed the upper limit, the controller is configured to select one of the number of turns or the pitch of the winding of the secondary coil satisfying a condition that the load resistance of the DC-DC converter when the electric power received from the primary resonant coil is a predetermined magnitude is higher than a load resistance when the electric power received from the primary resonant coil is maximum.

* * * * *